(12) United States Patent
Srinivasan et al.

(10) Patent No.: US 11,051,177 B2
(45) Date of Patent: Jun. 29, 2021

(54) METHOD AND SYSTEM FOR GENERATING A PROTECTION ZONE

(71) Applicant: CommScope Technologies LLC, Hickory, NC (US)

(72) Inventors: Navin Srinivasan, Fairfax, VA (US); Khalid W. Al-Mufti, Sterling, VA (US); Suryanarayana A. Kalenahalli, Chantilly, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/642,646

(22) PCT Filed: Jul. 24, 2018

(86) PCT No.: PCT/US2018/043511
§ 371 (c)(1),
(2) Date: Feb. 27, 2020

(87) PCT Pub. No.: WO2019/055133
PCT Pub. Date: Mar. 21, 2019

(65) Prior Publication Data
US 2020/0260290 A1  Aug. 13, 2020

Related U.S. Application Data

(60) Provisional application No. 62/559,887, filed on Sep. 18, 2017.

(51) Int. Cl.
*H04W 16/14* (2009.01)
*H04B 17/345* (2015.01)
(Continued)

(52) U.S. Cl.
CPC .......... *H04W 16/14* (2013.01); *H04B 17/345* (2015.01); *H04B 17/391* (2015.01); *H04W 28/0236* (2013.01)

(58) Field of Classification Search
CPC ..................................................... H04W 16/14
See application file for complete search history.

(56) References Cited

U.S. PATENT DOCUMENTS

| 2017/0195887 A1 | 7/2017 | Jovancevic |
| 2018/0284253 A1* | 10/2018 | Rocher ..................... G01S 5/16 |
| 2019/0215698 A1 | 7/2019 | Balachandran et al. |

FOREIGN PATENT DOCUMENTS

| WO | 2016033049 A1 | 3/2016 |
| WO | 2017139206 A1 | 8/2017 |

OTHER PUBLICATIONS

International Bureau, "International Preliminary Report on Patentability from PCT Application No. PCT/US2018/043511", from Foreign Counterpart to U.S. Appl. No. 16/642,646, dated Apr. 2, 2020, pp. 1 through 10, Publisher: WO.

(Continued)

*Primary Examiner* — Sulaiman Nooristany
(74) *Attorney, Agent, or Firm* — Fogg & Powers LLC

(57) ABSTRACT

In one embodiment, a method is provided. The method comprises defining propagation analysis points for radial line Rp; obtaining, from an external database, terrain elevation data for the radial line $R_p$ up to a maximum radial distance; determining the contour point for the radial line $R_p$; and upon determining the contour points for M radii, generating a protection zone perimeter.

23 Claims, 3 Drawing Sheets

(51) Int. Cl.
  *H04B 17/391*    (2015.01)
  *H04W 28/02*    (2009.01)

(56)          References Cited

OTHER PUBLICATIONS

"GDAL—Geospatial Data Abstraction Library", Retrieved Aug. 21, 2017 from ; pp. 1-3.
International Searching Authority, "International Search Report and Written Opinion from PCT Application No. PCT/US2018/043511 dated Nov. 7, 2018", pp. 1-14; Published in: WO.
Sohul et al., "Spectrum Access System for the Citizen Broadband Radio Service"; 5G Spectrum: Enabling the Future Mobile Landscape; Jul. 2015; pp. 18-25.
Vaka, Pradeep Reddy, "Security and Performance Issues in Spectrum Sharing between Disparate Wireless Networks", Masters of Science in Electrical Engineering; May 5, 2017; Virginia Polytechnic Institute and State University; pp. 1-82.
Wikipedia, "Vincenty's formulae"; Retrieved Aug. 14, 2017 from ; pp. 1-5.
Wireless Innovation Forum, "Requirements for Commercial Operation in the U.S. 3550-3700 MHz Citizens Broadband Radio Service Band"; CBRS WinnForum Standards; Jul. 13, 2017; pp. 1-70.
Wireless Innovation Forum, "Supporting file for comment 173 on WINNF-15-S-0112-V2.5.0", Spectrum Sharing Committee, Working Group 4, Apr. 7, 2017, pp. 15, Wireless Innovation Forum Contribution WINNF-17-I-00120.

\* cited by examiner

METHOD AND SYSTEM FOR GENERATING A PROTECTION ZONE

This application claims priority to International Patent Application No. PCT/US2018/043511 filed on Jul. 24, 2018, which claims priority to U.S. Provisional Patent Application No. 62/559,887 filed on Sep. 18, 2017, the contents of both of which are hereby incorporated herein in their entirety.

BACKGROUND

Spectrum access systems (SASs) are being developed to provide services in bands shared with other communications systems. Each spectrum access system regulates transmission of citizens broadband radio service devices (CBSDs) that form part of the SAS. To ensure that a CBSD can receive desired signals, the SAS determines and implements a protection zone around the CBSD. The boundary of the protection zone is defined as a set of points at which the CBSD received power level falls below a first threshold level. The SAS uses the protection zone to regulate the transmissions of other CBSDs proximate to the CBSD so that levels of interference, e.g. carrier to interference levels, within the protection zone do not exceed a second threshold level.

Received power level (in decibel-milliwatts or dBm) is transmitter power level (in dBm) plus antenna gain (in dBm) (e.g. at a gain at a specific azimuthal radiation angle) minus path loss. Path loss is calculated using one or more propagation models and terrain elevation data.

Conventionally, determining the protection zone entails estimating received power at up to tens of thousands of points around the location of the CBSD. When performing each estimate of received power for a specific point on a radial line, the SAS queries a remote server for the terrain elevation data. Requesting elevation data up to tens of thousands of times to determine each protection zone is slow process, and delays determination of the protection zone. Therefore, there is a need to expedite determination of the protection zone.

SUMMARY OF THE INVENTION

In one embodiment, a method is provided. The method comprises defining propagation analysis points for radial line $R_p$; obtaining, from an external database, terrain elevation data for the radial line $R_p$ up to a maximum radial distance; determining the contour point for the radial line $R_p$; and upon determining the contour points for M radii, generating a protection zone perimeter.

DRAWINGS

DETAILED DESCRIPTION

Figure 1:
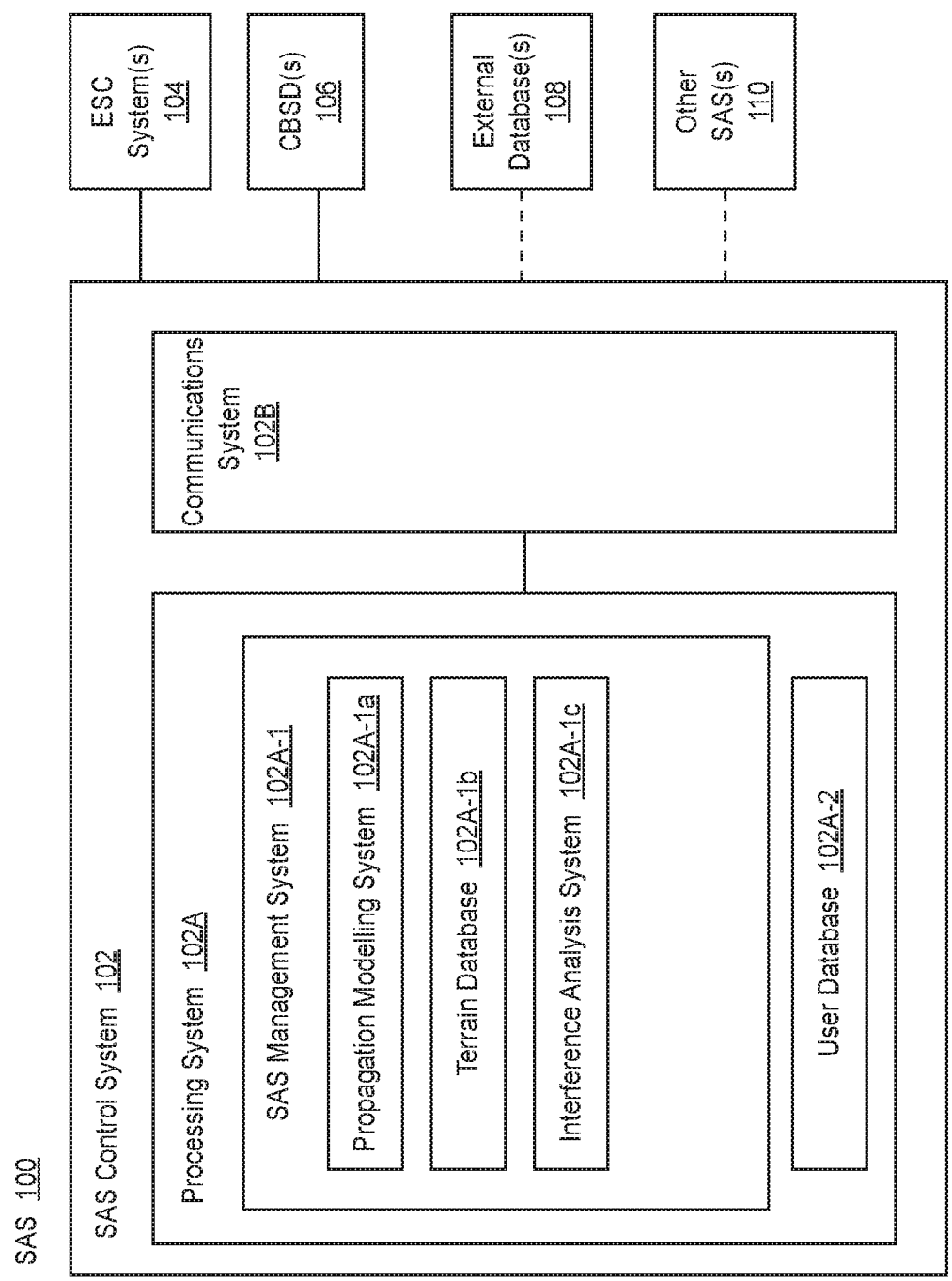
FIG. 1 illustrates one embodiment of a spectrum access system incorporating an efficient technique for generating a protection zone for a citizens broadband radio service device.

As will be subsequently further described, illustrated embodiments of the invention more efficiently retrieve elevation data. As a result, the time to determine each protection zone is significantly decreased, e.g. by an order of a magnitude. Spectrum access systems (SASs) will first be described.

Citizens broadband radio service devices (CBSDs) are part of a spectrum access system (including a SAS control system) which controls access to a frequency. In one embodiment, each CBSD is communicatively coupled to the SAS control system. The operational characteristics of each CBSD, such as operational frequency, transmit power, and channel bandwidth, are centrally controlled by the SAS control system. User equipment, e.g. a portable device such as a handset, a phablet, a tablet or a laptop, wirelessly communicates with a CBSD using a portion of the spectrum controlled by the SAS control system and assigned to the CBSD.

The CBSDs comprise systems of priority access licensees (PALs), and general authorized access (GAA) users. Systems of incumbent users also operate in the spectrum regulated by the SAS.

Incumbent users have first, or highest, priority to utilize the frequency spectrum (or spectrum) controlled by the SAS. Thus, incumbent users shall be able to operate free of interference from other users, e.g. priority access licensees and general authorized access users. Free of interference as used herein does not mean an absence of interference, but rather means an acceptable level of interference which may be no interference or a finite level of interference. The acceptable level of interference may vary by geography, frequency spectrum, user type, license type, and/or other indicia. In one embodiment, the incumbent users include governmental communications systems, operators of fixed satellite communications systems, and grandfathered, prior licensees of the spectrum. Communications systems, as used herein, shall include RADAR systems.

In one embodiment, priority access licensees have second, or intermediate, priority, after incumbents, to utilize the frequency spectrum controlled by the SAS control system (which is part of the SAS). In another embodiment, priority access licensees shall be able to operate, when not interfering with incumbent users, free of interference from other priority access licensees and general authorized access users. In a further embodiment, an ability of a PAL to operate free of interference shall be limited temporally, geographically, and spectrally by specifications in its license, e.g. from a government entity.

General authorized access users shall have third, or lowest, priority to utilize the frequency spectrum controlled by the SAS. In one embodiment, an operation of GAA users will be governed by rules pertaining to the SAS, e.g. governmental laws and regulations. For example, such rules shall only let GAA users operate when they do not interfere with incumbent users and PALs.

In one embodiment, the geographic coverage area and frequency spectrum controlled, at least in part, by the SAS control system may include exclusion zones and protection zones. CBSDs are prohibited from being located in exclusion zones. Further, the level of interference generated by, e.g. by all non-Federal users (PALs and GAA users) shall be limited in such exclusion zone so as not to interfere with certain incumbent users such as Federal RADAR systems. Each CBSD may only operate with the permission of the SAS, e.g. in a RADAR protection zone based upon information received by an environmental sensing capability (ESC) system (which will be subsequently described).

FIG. 1 illustrates one embodiment of a SAS 100 incorporating an efficient technique for generating protection zones. The illustrated SAS 100 includes a SAS control system 102 coupled to at least one environmental sensing capability (ESC) system 104, at least one CBSD (CBSD(s)) 106, and at least one external database (external database(s)) 108. Each CBSD is operated by a GAA user or a PAL.

The external databases include without limitation: (a) databases, e.g. government databases (such as provided by the U.S. Federal Communications Commission), which store information about CBSD(s), priority access licensees (PALs), and/or incumbent users; and (b) databases, e.g. government databases (such as the U.S. Geological Survey), storing information about terrain and other obstructions (e.g. buildings). In one embodiment, external databases that store terrain information store elevation data, e.g. every 30 m. In another embodiment, such data is geodesic map data.

In one embodiment, the SAS 100 is coupled to at least one other SAS (SAS(s)) 110, e.g. operating in the same or overlapping frequency spectrum. For example, such other SAS(s) 110 and their PALs, GAA users, and associated incumbent users may generate electromagnetic energy that overlaps the geographic region of the SAS 100, and thus must be accounted for by the SAS 100 when the SAS performs interference analysis, and authorizes operation of CBSDs 106 of the PALs and the GAA users. Alternatively, the SAS 100 and its PALs, GAA users, and associated incumbent users may generate electromagnetic energy that overlaps the geographic region of the other SAS(s) 110, and thus must be accounted for by the other SAS(s) 110 when the SAS performs interference analysis, and authorizes operation of CBSDs of PALs and GAA users (associated with the other SAS(s) 110). By coupling SASs that are geographically proximate to one another, each SAS can account for electromagnetic energy emitted from CBSD(s) of other SAS(s) proximate geographies.

The ESC system 104 detects, and communicates to the SAS 100, the presence of signal(s), e.g. from incumbent user(s). The SAS control system 102 uses this information, at least in part, to regulate the operation (e.g. power levels and frequencies of operation) of the CBSD(s) 106 to allow the incumbent user(s) to operate free of interference.

The SAS control system 102 controls the operation (e.g. power levels and frequencies of operation) of the GAA user(s) so that the PAL(s) operate free of interference. Further, the SAS control system 102 controls the operation e.g. power levels and frequencies of operation) of GAA user(s), e.g. so each GAA user operates free of interference.

In one embodiment, the SAS control system 102 includes a processing system 102A coupled to a communications system 102B. The processing system 102A controls the operation of CBSD(s) 106 that form part of the SAS 100.

The communications system 102B facilitates communications between the SAS control system 102 and other systems or devices, e.g. CBSD(s) 106, the ESC system(s) 104, and/or other SAS(s) 110. In one embodiment, the communications system 102B includes a modem, e.g. a Internet data modem, and/or any other communications device(s) that can facilitate communications to the aforementioned devices In one embodiment, the processing system 102A is a state machine, e.g. a processor coupled to a memory. However, in alternative embodiments, such processor and memory may be implemented in whole or in part with a field programmable gate array and/or an application specific integrated circuit. In another embodiment, processor may be implemented by a central processing unit(s) and/or digital signal processor(s). In a further embodiment, the second memory may be implemented by random access memory, flash memory, hard drives, and/or any other type of memory In the illustrated embodiment, the processing system 102A includes a SAS management system 102A-1 and a user database 102A-2. The user database 102A-2 includes information about geographic location, operating frequency spectrum, power output level of operation, modulation types, antenna radiation patterns, and/or maximum tolerable interference level of each CBSD of respectively the PALs and GAA users whose CBSDs are included in the SAS 100. In one embodiment, the SAS management system 102A-1 includes a propagation modeling system 102A-1a, a terrain database 102A-1b, and an interference analysis system 102A-1c. The interference analysis system 102A-1c performs interference analysis as described elsewhere herein. Database as used herein means any data storage technique, including a conventional database, data files, and/or storage registers.

The SAS management system 102A-1 will now be described in more detail. The SAS management system 102A-1 determines whether a prospective PAL or GAA user CBSD (prospective CBSD) can operate, e.g. in response to a request respectively from the PAL or GAA user CBSD. The SAS management system 102A-1 determines whether incumbent user(s) communications system(s) are operating, e.g. based upon information from the ESC system(s) 104, and whether operation of the PAL or GAA user CBSD would interfere with the operation of the incumbent user(s) communications system(s) and authorized PAL and/or GAA user CBSDs permitted to operate. To do so, the SAS management system 102A-1 estimates, using the propagation modeling system 102A-1a, the electromagnetic energy generated by authorized CBSDs in the SAS 100. In one embodiment, the electromagnetic energy of CBSDs proximate to the SAS 100, but not associated with the SAS 100, are also modeled.

To limit the computational analysis required, such interference analysis is performed within the protection zone of each CBSD of the SAS 100. In one embodiment, the protection zone is defined by a receive power threshold, e.g. −96 dBm/10 MHz as mandated by a standard such as a WinnForum Working Document WINNF-TS-0112 Version V1.2.0 (13 Jul. 2017). Ideally, the protection zone is substantially circular in shape, having substantially equal radii. However, practically, this is not always the case, because of terrain and hence propagation variations. Therefore, the protection zone must be modeled using terrain data, as will be subsequently described in further detail.

The propagation modeling system 102A-1a is used to determine a contour of a protection zone for a CBSD, and electromagnetic energy radiated by other CBSDs in the protection zone. The propagation modeling system 102A-1a includes one or more RF propagation models, which describe path loss, over geographic region, of a combination of a transmitter and antenna(s) for different propagation conditions. The selection of a propagation model depends upon frequency spectrum, the propagation path (e.g. including distance, geographical terrain, and physical obstructions such as buildings), antenna characteristics (e.g. angle of radiation and radiation polarization), potential atmospheric conditions (e.g. ionospheric conditions and the existence of meteor showers), and/or time (such as time of day and/or solar cycle). The propagation models may be public and/or proprietary models. Examples of propagation models include the Extended Hata and/or the irregular terrain models, and variations thereof.

In one embodiment, the propagation modeling system 102A-1a utilizes terrain data in the terrain database 102A-1b corresponding to the geographic region where propagation is modeled. In another embodiment, the SAS control system 102 initially obtains the terrain data from one of the external database(s) 108, and stores the terrain data in the terrain database 102A-1b.

After CBSD protection zones have been modeled, the interference analysis system 102A-1c determines whether the additional electromagnetic energy contributed by the prospective CBSD causes an incumbent user communications system or CBSD associated with the SAS 102 to suffer an unacceptable level of interference. For example, this is performed by determining if the aggregate electromagnetic energy level (including the additional electromagnetic energy contributed by the prospective CBSD) within the protection zone of, and in or about the operating frequency of, each such CBSD and incumbent user communications system exceeds the specified maximum tolerable interference level of each such system.

Figure 2A:
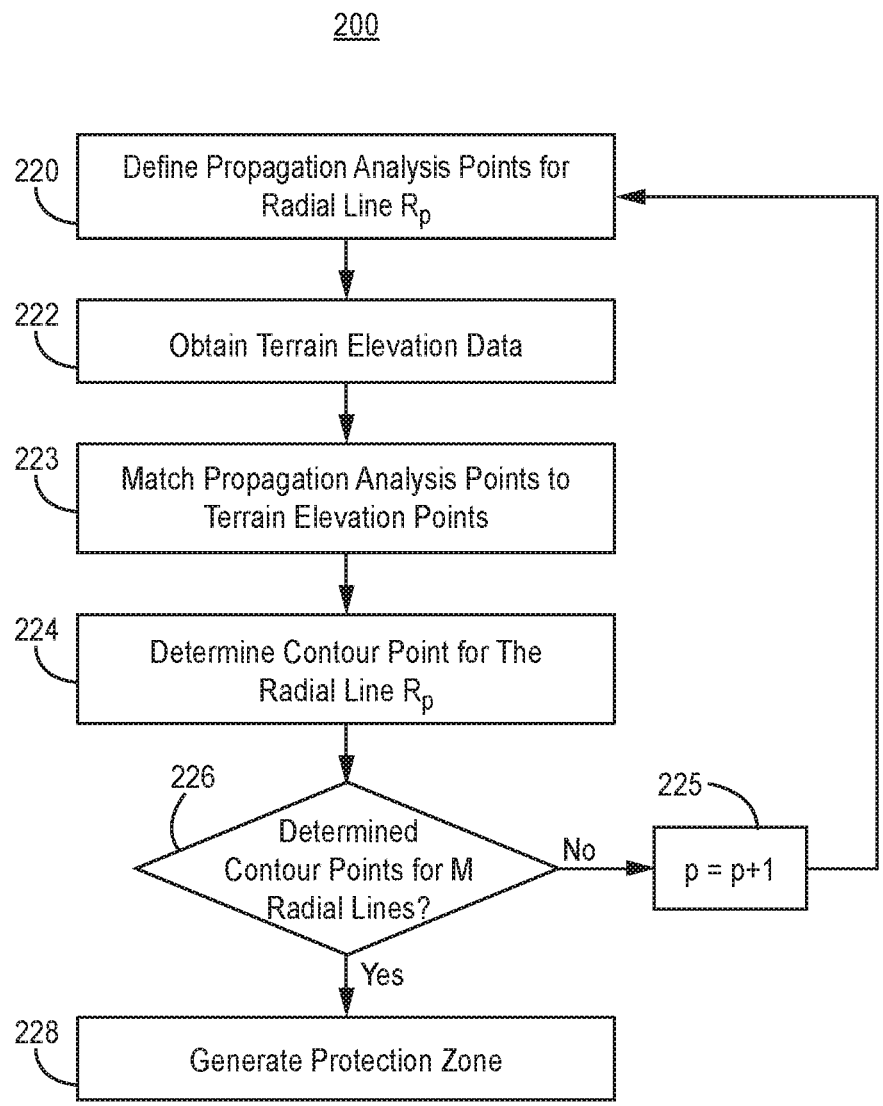
FIG. 2A illustrates one embodiment of a method of generating a protection zone for a citizens broadband radio service device.

To more efficiently perform such analysis, the protection zone perimeter is determined as described below. FIG. 2A illustrates one embodiment of a method of generating a protection zone for a CBSD 200. To the extent the method 200 shown in FIG. 2A is described herein as being implemented in the systems shown in FIG. 1, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Figure 2B:
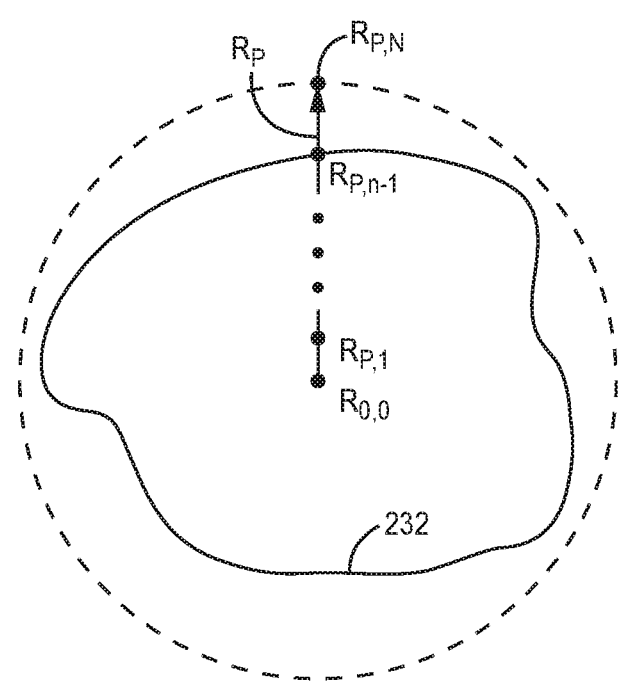
FIG. 2B illustrates one embodiment of a protection zone for a citizens broadband radio service device.

FIG. 2B illustrates one embodiment of a protection zone 230 for a CBSD. The protection zone 230 includes a protection zone perimeter 232. The embodiment includes radial line $R_p$ and N propagation analysis points along radial line $R_p$; however only propagation analysis points $R_{p,1}$, $R_{p,n-1}$, and $R_{p,N}$ along radial line $R_p$ are illustrated for ease of view.

In one embodiment, the following blocks are performed by the propagation modeling system 102A-1a. In block 220, for radial line $R_p$, where p=0, m, . . . 360-m, where m is an incremental angle used to define the radial lines, define propagation analysis points $(R_{p,n})$ where n is the $n^{th}$ propagation analysis point on the radial line $R_p$ and n=0, . . . N. In one embodiment, N is determined by taking the integer value of the quotient of a maximum radial distance $(R_{max})$ divided by an incremental distance (S) between propagation analysis points on a radial line $R_p$; the location of the CBSD shall be deemed a propagation analysis point for this purpose. The radial line extends from the location of the CBSD to a maximum radial distance $R_{max}$. In one embodiment, (N+1)*(360/m) is the total number of propagation analysis points for a given CBSD. In a further embodiment, $R_{max}$ and S defined by a standard such as the WinnForum Working Document WINNF-TS-0112 Version V1.2.0 (13 Jul. 2017). In yet another embodiment, a latitude and longitude for each propagation analysis point is calculated along the radial line $R_p$ using the latitude and longitude of the CBSD $(R_{0,0})$, an incremental distance (S) between propagation analysis points on radial line $R_p$, and one of Vincenty's formulae.

In block 222, obtain terrain elevation data, from an external database, for a radial line $R_p$ defined by the CBSD location $(R_{0,0})$ to the propagation analysis point which is at $R_{max}$ distance from the CBSD location. Thus, terrain elevation data for the radial line $R_p$ is obtained up to the maximum radial distance. In one embodiment, prior to obtaining the terrain elevation data, determine terrain elevation points by calculating the latitude and longitude of each terrain elevation point on the radial line $R_p$ using the latitude and longitude of the CBSD $(R_{0,0})$, an incremental distance between terrain elevation points on radial line $R_p$, and one of Vincenty's formulae. Then, obtain the terrain elevation data for the terrain elevation points from the external database using the calculated latitude and longitude of each terrain elevation point.

Because the terrain elevation data may not exist in the external database at exactly the calculated latitude and longitude, the terrain elevation data may have to be estimated. In one embodiment, estimating the terrain elevation data is performed as follows. Firstly, obtain a set of elevations for two or more, e.g. four, pairs of latitudes and longitudes proximate to the calculated latitude and longitude for each terrain elevation point. In another embodiment, sets of terrain elevations for the two or more pairs are simultaneously obtained for each terrain elevation point along the radial line $R_p$. For example, when using an external terrain elevation database, such as provided by the U.S. Geological Service database, use a geospatial data abstraction library (GDAL) to determine the two or more pairs of latitudes and longitudes proximate to the calculated latitude and longitude. Then, perform interpolation, e.g. linear or non-linear interpolation such as bi-linear interpolation, to estimate the terrain elevation from the terrain elevations of the proximate two or more pairs of latitudes and longitudes. In another embodiment, store the obtained terrain elevation data, e.g. in the terrain database 102A-1b.

In block 223, for each propagation analysis point $(R_{p,n})$, which are defined at some spacing interval S, e.g. 200 m, on the radial line $R_p$, match latitude and longitude of each propagation analysis point $(R_{p,n})$ to the closet latitude and longitude of the terrain elevation point obtained from block 222. From the elevation data obtained in block 222, for a radial line Rp, obtain elevations from a subset of terrain elevation points that correspond to the propagation analysis points. Then, calculate the path loss value, based on the subset, at each propagation analysis point.

In block 224, determine the contour point for the radial line $R_p$. In one embodiment, calculate, along radial line $R_p$, the received power level, e.g. using the propagation modeling described above, propagation analysis point by propagation analysis point commencing at propagation analysis point $R_{p,1}$. In another embodiment, utilize terrain elevation data obtained in block 222. When an estimated received power level falls below a received power level threshold, cease calculations along the radial line $R_p$. The propagation analysis point where the estimated received power level first falls below the received power level threshold is a contour point comprising part of the contour of the protection area. In one embodiment, the received power level threshold is defined by a standard such as the WinnForum Working Document WINNF-TS-0112 Version V1.2.0 (13 Jul. 2017). In a further embodiment, the received power level threshold is −96 dBm/10 MHz.

In block 226, determine if contour points have been determined for M radii. M equals three hundred and sixty degrees divided by m. In one embodiment, if M is a non-integer number, determine if contour points have been determined for integer (M) radii. If not all of the contour points have been determined, then in block 225, add one to p (or p=p+1), and return to block 220. If all of the contour points have been determined, proceed to block 228.

In block 228, create a protection zone perimeter 232 by connecting all contour points. In one embodiment, connect all contour points with a smoothing filter, such as a low pass filter; to create a smoothed protection zone perimeter.

EXAMPLE EMBODIMENTS

Example 1 includes a spectrum access system (SAS) control system of a first SAS, comprising: a processing system configured to: on a radial line by radial line basis, define propagation analysis points for at least one radial line; for each radial line, obtain, from an external database, terrain elevation data up to a maximum radial distance; for each radial line, determine contour points; and generate a protection zone perimeter; a communications system coupled to the processing system; wherein the communications system is configured to be coupled to the external database and at least one citizens broadband radio service devices (CBSDs).

Example 2 includes the SAS control system of Example 1, wherein the communications system is configured to be coupled to at least one of: at least one environmental sensing capability (ESC) system, and at least one other SAS.

Example 3 includes the SAS control system of any of Examples 1-2, wherein the processing system comprises: SAS management system; a user database; and wherein the SAS management system is configured to: on a radial line by radial line basis, define the propagation analysis points for at least one radial line; for each radial line, obtain, from the external database, the terrain elevation data up to the maximum radial distance; for each radial line, determine the contour points; and create the protection zone perimeter.

Example 4 includes the SAS control system of any of Examples 1-3, wherein the SAS management system comprises: a propagation modeling system configured to: on a radial line by radial line basis, define the propagation analysis points for at least one radial line; for each radial line, obtain, from the external database, the terrain elevation data up to the maximum radial distance; for each radial line, determine the contour points; and create the protection zone perimeter; and a terrain database configured to store the terrain elevation data obtained from the external database.

Example 5 includes the SAS control system of any of Examples 1-4, wherein the SAS management system further comprises an interference analysis system.

Example 6 includes a method comprising, defining propagation analysis points for radial line $R_p$; obtaining, from an external database, terrain elevation data for the radial line $R_p$ up to a maximum radial distance; determining the contour point for the radial line $R_p$; and upon determining the contour points for M radii, generating a protection zone perimeter.

Example 7 includes the method of Example 6, where generating the protection zone perimeter further comprises low pass filtering the protection zone perimeter.

Example 8 includes the method of any of Examples 6-7, wherein obtaining, from the external database, terrain elevation data for the radial line $R_p$ up to the maximum radial distance comprises: obtaining a set of terrain elevations for two or more pairs of latitudes and longitudes proximate to the calculated latitude and longitude of each terrain elevation point; and estimating the terrain elevation for the calculated latitude and longitude of each terrain elevation point by performing interpolation, using the obtained set of elevations, for each propagation analysis point.

Example 9 includes the method of Example 8, wherein the obtaining the set of terrain elevation is performed substantially simultaneously for all propagation analysis points along the radial line $R_p$.

Example 10 includes the method of any of Examples 8-9, wherein the estimating the terrain elevation is performed by using bi-linear interpolation of the obtained set of elevations for each propagation analysis point.

Example 11 includes the method of any of Examples 6-10, wherein the obtaining the set of terrain elevation comprises calculating the latitude and longitude of each terrain elevation point on the radial line $R_p$ using a latitude and longitude of a CBSD ($R_{0,0}$), an incremental distance between terrain elevation points on radial line $R_p$, and one of Vincenty's formulae.

Example 12 includes the method of any of Examples 6-11, wherein defining propagation analysis points comprises: selecting (N+1)*(360/m) propagation analysis points, where m is an incremental angle and N is the number of propagation analysis points along each radial line $R_p$.

Example 13 includes the method of Example 12, further comprising determining N by taking the integer value of the quotient of a maximum radial distance ($R_{max}$) divided by an incremental distance (S) between propagation analysis points on the radial line $R_p$.

Example 14 includes a program product comprising a non-transitory processor readable medium on which program instructions are embodied, wherein the program instructions are configured, when executed by at least one programmable processor, to cause the at least one programmable processor to: define propagation analysis points for radial line $R_p$; obtain, from an external database, terrain elevation data for the radial line $R_p$ up to a maximum radial distance; determine the contour point for the radial line $R_p$; and upon determining the contour points for M radii, generating a protection zone perimeter.

Example 15 includes the program product of Example 14, wherein generate the protection zone perimeter further comprises low pass filter the protection zone perimeter.

Example 16 includes the program product of any of Examples 14-15, wherein obtain, from the external database, terrain elevation data for the radial line $R_p$ up to the maximum radial distance comprises: obtain a set of terrain elevations for two or more pairs of latitudes and longitudes proximate to the calculated latitude and longitude of each terrain elevation point; and estimate the terrain elevation for the calculated latitude and longitude of each terrain elevation point by performing interpolation, using the obtained set of elevations, for each terrain elevation point.

Example 17 includes the program product of Example 16, wherein the obtaining the set of terrain elevation is performed substantially simultaneously for all propagation analysis points along the radial line $R_p$.

Example 18 includes the program product of any of Examples 16-17, wherein the obtaining the set of terrain elevation comprises calculating the latitude and longitude of each terrain elevation point on the radial line $R_p$ using a latitude and longitude of a CBSD ($R_{0,0}$), an incremental distance (S) between terrain elevation points on radial line $R_p$, and one of Vincenty's formulae.

Example 19 includes the program product of any of Examples 14-18, wherein defining propagation analysis points comprises: selecting (N+1)*(360/m) propagation analysis points, where m is an incremental angle and N is the number of propagation analysis points along each radial line $R_p$.

Example 20 includes the program product of Example 19, wherein the program instructions are further configured to cause the at least one programmable processor to determine N by taking the integer value of the quotient of a maximum radial distance ($R_{max}$) divided by an incremental distance (S) between propagation analysis points on a radial line $R_p$.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A spectrum access system (SAS) control system of a first SAS, comprising:
    processing circuitry configured to:
        on a radial line by radial line basis, define propagation analysis points for at least one radial line;
        for each radial line, determine terrain elevation data for a propagation analysis point on the corresponding radial line at a maximum radial distance, where the terrain elevation data is determined using terrain elevations, for terrain elevation points on a radial line, obtained from an external database;
        for each radial line, determine contour points; and
        upon determining the contour points, generate a protection zone perimeter around a radio, where the processing circuitry is further configured to regulate transmission of one or more other radios in the protection zone perimeter so that a level of interference from the one or more other radios within a protection zone does not exceed a first threshold level; and
    a communications system coupled to the processing circuitry;
    wherein the communications system is configured to be coupled to the external database and at least one radio.

2. The SAS control system of claim 1, wherein the communications system is configured to be coupled to at least one of: at least one environmental sensing capability (ESC) system, and at least one other SAS.

3. The SAS control system of claim 1, wherein determining terrain elevation data comprises estimate a terrain elevation for a terrain elevation point on a radial line using two or more terrain elevations obtained from the external database.

4. The SAS control system of claim 1, wherein determining the terrain elevation data comprises calculate a lateral position of each terrain elevation point on each radial line using a lateral position $R_{0,0}$ of the radio, an incremental distance between terrain elevation points on each radial line, and one of Vincenty's formulae.

5. The SAS control system of claim 1, wherein defining the propagation analysis points comprises select (N+1)*(360/m) propagation analysis points, where m is an incremental angle and N is a number of propagation analysis points along each radial line.

6. A method, configured to be performed by a spectrum access system (SAS) control system of a SAS, comprising:
    defining propagation analysis points for radial line $R_p$;
    determining terrain elevation data for a propagation analysis point on the radial line $R_p$ at a maximum distance, where the terrain elevation data is generated using terrain elevations, for terrain elevation points on the radial line $R_p$, obtained from an external database;
    determining a contour point for the radial line $R_p$; and
    upon determining contour points for M radial lines, generating a protection zone perimeter around a radio, where transmission of one or more other radios in the protection zone perimeter is regulated so that a level of interference at the radio from the one or more other radios within the protection zone does not exceed a first threshold level;
    wherein the SAS control system is configured to be coupled to at least one radio.

7. The method of claim 6, wherein generating the protection zone perimeter further comprises low pass filtering the protection zone perimeter.

8. The method of claim 6, wherein determining the terrain elevation data comprises:
    estimating a terrain elevation for a terrain elevation point on the radial line $R_p$ using two or more terrain elevations obtained from the external database.

9. The method of claim 8, wherein estimating the terrain elevation comprises interpolating terrain elevation using the two or more terrain elevations obtained from the external database.

10. The method of claim 6, wherein determining the terrain elevation data comprises calculating a lateral position of each terrain elevation point on the radial line $R_p$ using a lateral position of a radio $R_{0,0}$, an incremental distance between terrain elevation points on the radial line $R_p$, and one of Vincenty's formulae.

11. The method of claim 6, wherein defining the propagation analysis points comprises:
    selecting (N+1)*(360/m) propagation analysis points, where m is an incremental angle and N is a number of propagation analysis points along each radial line $R_p$.

12. The method of claim 11, further comprising determining N by taking an integer value of a quotient of a maximum radial distance $R_{max}$ divided by an incremental distance between propagation analysis points on the radial line $R_p$.

13. A program product comprising a non-transitory processor readable medium on which program instructions are embodied, wherein the program instructions are configured, when executed by at least one programmable processor of a spectrum access system (SAS) control system of a SAS, to cause the at least one programmable processor to:
    define propagation analysis points for radial line $R_p$;
    determine terrain elevation data for a propagation analysis point on the radial line $R_p$ at a maximum distance, where the terrain elevation data is generated using terrain elevations, for terrain elevation points on the radial line $R_p$, obtained from an external database;
    determine a contour point for the radial line $R_p$; and
    upon determining contour points for M radial lines, generating a protection zone perimeter around a radio, where transmission of one or more other radios in the protection zone perimeter is regulated so that a level of interference at the radio from the one or more other radios within a protection zone does not exceed a first threshold level;
    wherein the SAS control system is configured to be coupled to at least one radio.

14. The program product of claim 13, wherein generating the protection zone perimeter further comprises low pass filter the protection zone perimeter.

15. The program product of claim 13, wherein determining the terrain elevation data comprises:
    estimate a terrain elevation for a terrain elevation point on the radial line $R_p$ using two or more terrain elevations obtained from the external database.

16. The program product of claim 15, wherein estimating the terrain elevation comprises interpolating terrain elevation using two or more terrain elevations obtained from the external database.

17. The program product of claim 13, wherein determining the terrain elevation data comprises:
    calculate a lateral position of each terrain elevation point on the radial line $R_p$ using a lateral position of a radio $R_{0,0}$, an incremental distance between terrain elevation points on the radial line $R_p$, and one of Vincenty's formulae.

18. The program product of claim 13, wherein defining the propagation analysis points comprises:
    selecting $(N+1)*(360/m)$ propagation analysis points, where m is an incremental angle and N is a number of propagation analysis points along each radial line $R_p$.

19. The program product of claim 18, wherein the program instructions are further configured to cause the at least one programmable processor to determine N by taking an integer value of a quotient of a maximum radial distance $R_{max}$ divided by an incremental distance between propagation analysis points on a radial line $R_p$.

20. The SAS control system of claim 1, wherein determining the contour point comprises:
    for each propagation analysis point, match a lateral position of the propagation analysis point to a closest lateral position of a terrain elevation point on the radial line;
    obtain elevations from the terrain elevation data for a subset of terrain elevation points on the radial line corresponding to each propagation analysis point on the radial line; and
    determine a propagation analysis point on the radial line closest to the radio from which the radial line projects where an estimated power level is below a second threshold level.

21. The SAS control system of claim 3, wherein estimating the terrain elevation comprises interpolate a terrain elevation using the two or more terrain elevations obtained from the external database.

22. The method of claim 6, wherein determining the contour point comprises:
    for each propagation analysis point, matching a lateral position of the propagation analysis point to a closest lateral position of a terrain elevation point on the radial line;
    obtaining elevations from the terrain elevation data for a subset of terrain elevation points on the radial line $R_p$ corresponding to each propagation analysis point on the radial line $R_p$; and
    determining a propagation analysis point on the radial line $R_p$ closest to the radio from which the radial line $R_p$ projects where an estimated power level is below a second threshold level.

23. The program product of claim 13, wherein determining the contour point comprises:
    for each propagation analysis point, match a lateral position of the propagation analysis point to a closest lateral position of a terrain elevation point on the radial line;
    obtain elevations from the terrain elevation data for a subset of terrain elevation points on the radial line $R_p$ corresponding to each propagation analysis point on the radial line $R_p$; and
    determine a propagation analysis point on the radial line $R_p$ closest to the radio from which the radial line $R_p$ projects where an estimated power level is below a second threshold level.

\* \* \* \* \*